(12) United States Patent
Han et al.

(10) Patent No.: US 7,116,452 B2
(45) Date of Patent: Oct. 3, 2006

(54) METHOD OF CALIBRATING A SCANNER TO A PRINTER

(75) Inventors: Yao Han, Lexington, KY (US); Xuan-Chao Huang, Lexington, KY (US); Brant Dennis Nystrom, Lexington, KY (US); Richard Lee Reel, Georgetown, KY (US)

(73) Assignee: Lexmark International, Inc., Lexington, KY (US)

( * ) Notice: Subject to any disclaimer, the term of this patent is extended or adjusted under 35 U.S.C. 154(b) by 969 days.

(21) Appl. No.: 10/122,748

(22) Filed: Apr. 15, 2002

(65) Prior Publication Data

US 2003/0193678 A1 Oct. 16, 2003

(51) Int. Cl.
H04N 1/46 (2006.01)
G06K 1/00 (2006.01)

(52) U.S. Cl. .................. 358/530; 358/504; 358/1.9

(58) Field of Classification Search ................. 382/162, 382/167; 358/500, 504, 515, 518, 520, 525, 358/530, 2.1, 1
See application file for complete search history.

(56) References Cited

U.S. PATENT DOCUMENTS

| | | |
|---|---|---|
| 4,500,919 A | 2/1985 | Schreiber |
| 5,331,439 A | 7/1994 | Bachar |
| 5,420,704 A | 5/1995 | Winkelman |
| 5,483,360 A | 1/1996 | Rolleston et al. |
| 5,579,031 A * | 11/1996 | Liang .................... 345/604 |
| 5,581,376 A | 12/1996 | Harrington |
| 5,774,238 A | 6/1998 | Tsukada |
| 5,787,193 A | 7/1998 | Balasubramanian |
| 5,987,168 A | 11/1999 | Decker et al. |
| 6,061,501 A | 5/2000 | Decker et al. |
| 6,072,901 A | 6/2000 | Balonon-Rosen et al. |
| 6,104,829 A | 8/2000 | Nakajima |
| 6,137,594 A | 10/2000 | Decker et al. |
| 6,137,596 A | 10/2000 | Decker et al. |
| 6,151,135 A | 11/2000 | Tanaka et al. |
| 6,297,826 B1 | 10/2001 | Semba et al. |
| 6,301,025 B1 | 10/2001 | DeLean |
| 6,327,052 B1 | 12/2001 | Falk |
| 6,765,691 B1 * | 7/2004 | Kubo et al. ............... 358/1.9 |
| 2003/0006951 A1 * | 1/2003 | Ito ............................ 345/89 |
| 2003/0142377 A1 * | 7/2003 | Yamada et al. ........... 358/521 |
| 2003/0193678 A1 * | 10/2003 | Han et al. ................. 358/1.9 |

FOREIGN PATENT DOCUMENTS

GB 2213674 * 8/1989

* cited by examiner

*Primary Examiner*—Jerome Grant, II
(74) *Attorney, Agent, or Firm*—John Victor Pezdak (57) ABSTRACT

An electronic representation of the range of color combinations that can be displayed on the monitor is created and printed. The printed representation is then scanned by the scanner. A relationship is then identified between the monitor and the scanner. This relationship is then used as the basis to determine a relationship between the scanner and the monitor. Compensation is made for errors and the relationship is further developed. Finally, a scanner RGB to printer CMYK lookup table is built.

9 Claims, 4 Drawing Sheets

Figure 1. Typical process of building scanner to printer color table (Prior Art)

Figure 2. Process of building scanner to printer color table of present invention.

(a) Uniform monitor RGB grids
$M = f^{-1}(U)$
$H = f^{-1}(T)$ (b) Uniform scanner RGB grids
$U = f(M)$
$T = f(H)$, $S \approx f(H)$
Error weight = distance between S and T.

Fig. 5

Figure 6. (a) Three-dimensional error estimation.

Figure 6. (b) Error along z-axis.

Figure 6. (c) Bottom plane of a small cube.

Figure 6. (d) Top plane of a small cube.

METHOD OF CALIBRATING A SCANNER TO A PRINTER

STATEMENT REGARDING FEDERALLY SPONSORED RESEARCH OR DEVELOPMENT

Not Applicable.

CROSS-REFERENCE TO RELATED APPLICATIONS

None.

BACKGROUND OF THE INVENTION

1. Field of the Invention

The invention relates to color printing, and more specifically, to converting an input file defined in terms of a three dimensional color space to a color space that is consistent with a printer's capability.

2. Related Art

A color image is displayed on a monitor in terms of Red, Green and Blue (RGB). A color image is scanned in terms of RGB. The color image is printed on a printer using Cyan, Magenta, Yellow and Black (CMYK) inks.

For additive color processes, such as those used in display monitors, red, green, and blue are primary colors. In theory, mixing red, green, and blue light in various combinations can produce any color. For example, cyan is a mixture of green and blue and magenta is a mixture of red and blue. Black is the absence of any red, green, or blue; while white contains all three. A display monitor involves an additive process of light, and therefore, any color it produces can be defined in terms of Red (R), Green (G) and Blue (B).

In a printing process, inks are typically deposited on white paper which already reflects the full amount of red, green, and blue. Instead of adding red, green and blue (RGB) together to produce any color, quantities of red, green, and blue are removed to produce a desired color. To do this, filters or inks have to be produced which filter individual primary colors, while not affecting the other two. The filter colors which accomplish this are the colors which are the complement of the primary colors. For example, yellow is the complement of blue. A blue filter, one which filters out blue light, passes red and green and thus appears yellow. Yellow ink can be thought of as an ink which removes blue. Thus, the complement of blue is yellow; the complement of red is cyan; and the complement of green is magenta. As such, cyan, magenta, and yellow are the primary colors in the subtractive color system and are known as the process colors in the printing industry.

Theoretically, with only three colors of ink: cyan (C), magenta(M) and yellow (Y), a printer could print any color. White can be obtained by putting no ink on the paper; and black can be obtained by putting cyan, magenta, and yellow on the paper, blocking all light. Realistically, however, the color obtained when placing cyan, magenta, and yellow on paper may not be pure black. It may be brownish. Consequently, black ink is typically added to the printing process color set. The black ink not only insures a richer black color, but it also reduces the amount of ink that has to be used to produce most colors. For example, if at any one place on the paper, quantities of C, M, and Y are placed, there will be a gray component which can be removed and replaced with black. This reduces the total amount of ink on the paper and produces better grays and blacks. In addition, it increases the gamut of the color set.

As shown above, color can be expressed in several ways. A color can be expressed in terms of percents of RGB (red, green, blue), CMY, (cyan, magenta, yellow) or CMYK (cyan, magenta, yellow, black). None of these color spaces, as they are called, are defined as to what color is produced by mixing combinations of each. Generally, these color spaces are referred to as being device dependent, since the color produced by a given CMYK mix on one printer will not produce the same color on another.

An attempt has been made in the United States to standardize the process color inks so that the colors can be predicted. A standard called SWOP (Specification for Web Offset Publication) has been published which standardized the process ink colors. Recently, the standard has been taken a step further and 928 combinations of CMYK have been defined as to what color will result in a device independent color space (CIE XYZ or CIE L*a*b*). In Europe, a standard called Euroscale has been developed for four different paper surfaces. SWOP and Euroscale are very close, but not exactly the same.

In 1931, the organization called the Commission Internationale L'Eclairge (International Commission of Lighting), the CIE, met to try to establish a system of device independent color, color based on human sight. While attempting to define RGB, problems arose which persuaded the members to process the data through a matrix transform which produced a color space called CIE XYZ or XYZ. Since the XYZ color space is based on the human perception of color, any two different colors, even though the spectrum of these two colors may be different, will be perceived as the same color by a human if the XYZ values are the same under given lighting conditions.

From the XYZ color space, additional color spaces have been derived. One of these is called CIE L*a*b*, pronounced C Lab, or L*a*b*. This color space is based on XYZ of the color referenced to XYZ of the light source or paper. Most specifications such as the SWOP standard are specified in terms of XYZ and L*a*b* under a light source such as daylight D50. It is a three component color space with each color specified in terms of L*, a*, and b*. L* specifies the lightness; and the hue and saturation are determined from the values of a* and b*.

As previously discussed, a display monitor involves an additive process of light, and therefore, any color it produces can be defined in terms of RGB. However, a printing process is a subtractive process since it is printing on white paper, and therefore, color printers use cyan (C), magenta (M), and yellow (Y) or cyan, magenta, yellow and black (K), i.e., CMY or CMYK, to produce various colors. There has been an emphasis placed on the ability to accurately display an image on a monitor as well as the ability to accurately print an image on a printer. The internet and electronic mail have provided a level of interconnectivity that has driven the necessity of device independent color spaces. Uniform monitor display and uniform printer output ensure that individuals using different machines are seeing the same image. As a result of much research and development, most computer systems in the home and office now have the ability to incorporate these device independent color spaces into the monitor and the printer. The software controlling the printer relates the RGB values displayed to the CMYK values printed in accordance with the standardized colors.

Scanner technology continues to improve and become more affordable. As a result, all-in-one (AIO) devices (a combination printer, scanner and facsimile machine) have been increasingly used in homes and offices. Stand alone scanners can also be easily added to existing systems. The input to the printer may come from a personal computer (PC) or the scanner. A scanner measures the RGB of an image. In the copy mode (scanned image subsequently printed by printer), a multi-step process is required. First, the image is scanned in terms of RGB. Next, these RGB values are converted into device independent color values (i.e. CIE L*a*b). Several United States Patents utilize this device independent approach. Finally, the corresponding CMYK values are computed and printed. This is very similar to the monitor/display process and requires resource allocation sufficient to handle the process. U.S. Pat. No. 4,500,919 discloses a method of color reproduction on a monitor display. The device independent color space calculations allow the scanner to be used with different printers in different systems. U.S. Pat. Nos. 6,137,594; 6,072,901; 6,297,826 and 5,483,360 all utilize device independent color spaces to calibrate the printer.

In the case of an AIO device or a standalone scanner not intended to be removed from the printer, the above method is unnecessary. The device independent color space calculations duplicate the process already provided for in the relationship between the monitor and the printer to provide standardized colors. Resources must be allocated to create the scanner to printer relationship in the form of software running on the CPU or imbedded in firmware associated with the scanner. U.S. Pat. No. 5,339,176 discloses a method of color calibration that is device dependent. The '176 patent discloses a method of calibrating a scanner by directly creating a lookup table between a scanner point and a printer point. The calibration then changes the manner in which the scanner functions (column 16, lines 52–55). As a result, a new value will be assigned to a previous point. For example prior to calibration, a point may have a red value of 10 measured by the scanner. After the calibration the same point may have a red value of 11 measured by the scanner. This method requires the scanner program to be changed. The present invention achieves the same result without changing the function of the scanner.

SUMMARY OF THE INVENTION

The present invention provides a new process especially useful with an AIO device which does not require a change in the way the scanner functions. This invention would also be useful to incorporate a standalone scanner into an existing system or to re-calibrate an existing system. The present invention determines a scanner to printer relationship by determining the relationship between a scanner RGB point and a monitor RGB point without the necessity of measuring L*a*b. Once this relationship has been determined the corresponding CMYK points for each scanner RGB point can be determined from the existing monitor to printer table. A scanner to printer look up table can then be generated.

An electronic representation of the range of color combinations that can be displayed on the monitor is created and printed. The printed representation is then scanned by the scanner. A relationship is then identified between the monitor and the scanner. This relationship is then used as the basis to determine a relationship between the scanner and the monitor. Compensation is made for errors and the relationship is further developed. Finally, a scanner RGB to printer CMYK lookup table is built.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 3:
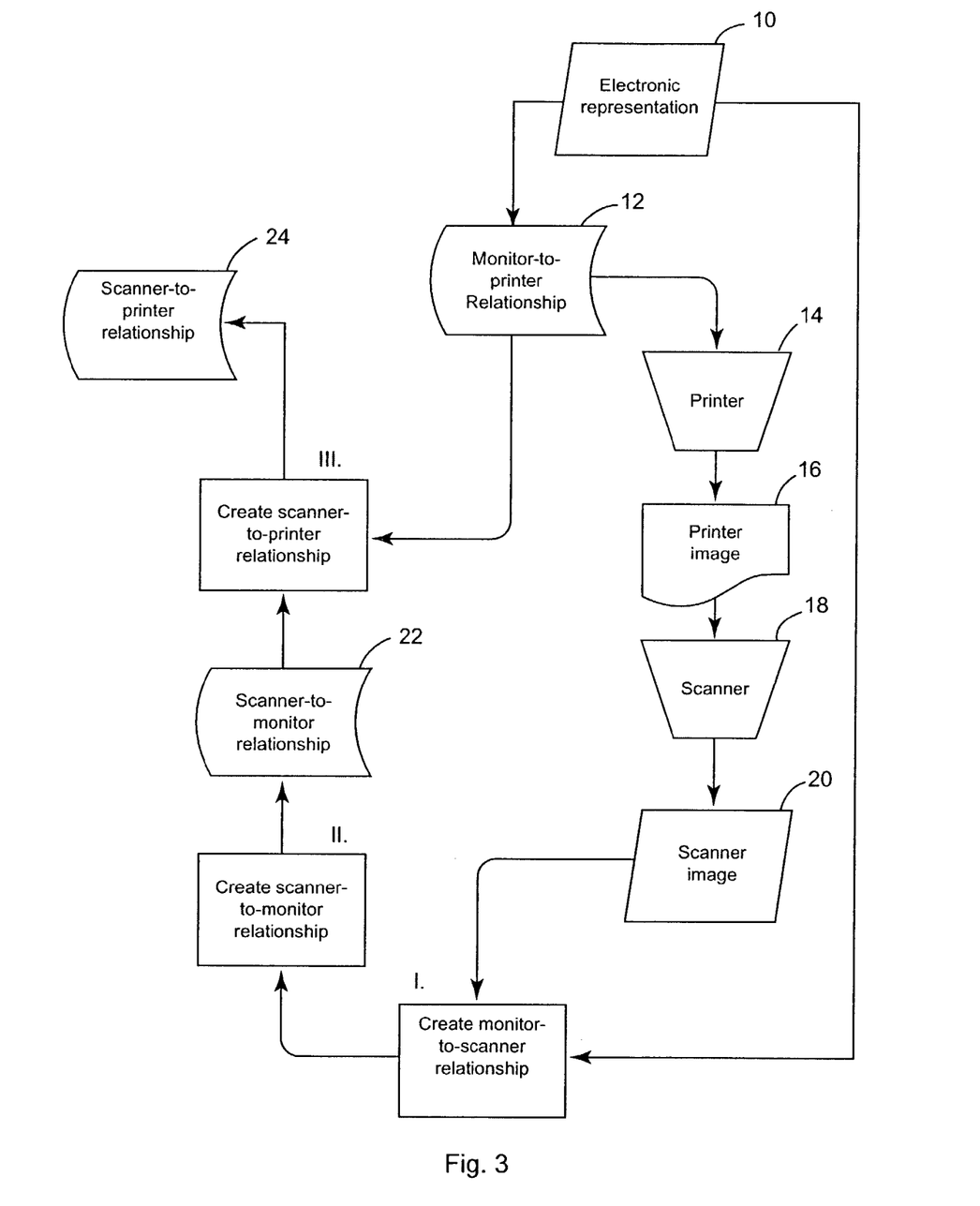
FIG. 3 illustrates an expanded flow chart of the present invention.

Referring to the accompanying drawings in which like reference numbers indicate like elements, FIG. 3 illustrates a flow chart of the present method.

Figure 1:
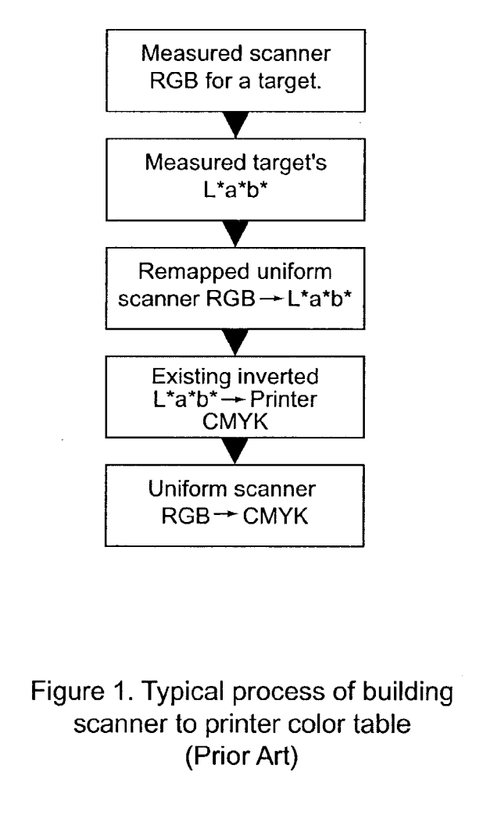
FIG. 1 illustrates a flow chart corresponding to the prior art.
Figure 2:
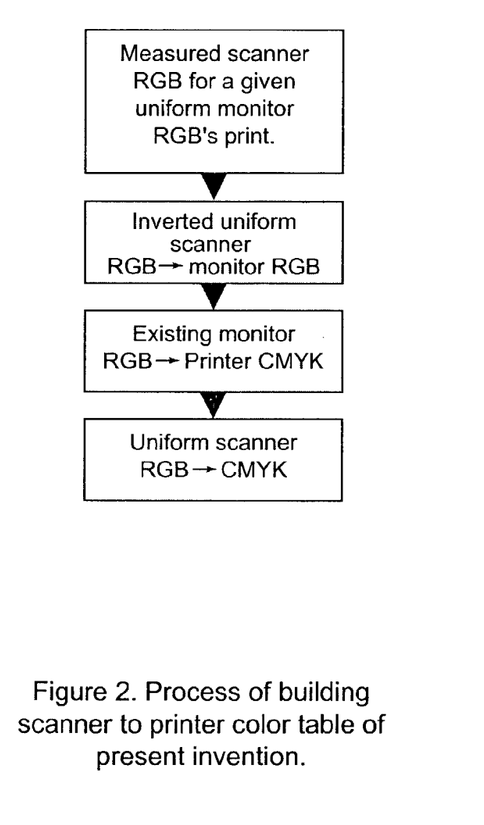
FIG. 2 illustrates a flow chart of the present invention.

The major procedures of the present invention include: (1) Build monitor RGB to scanner RGB lookup table; (2) Build inverted scanner RGB to monitor RGB lookup table; and (3) Build scanner RGB to printer CMYK lookup table. In the first procedure, uniform cubic monitor RGB grids are sent to the printer to print color patches. These patches are then scanned with the scanner to build a monitor-to-scanner RGB lookup table. In the second procedure, the method developed in the present invention is used to invert the lookup table into a scanner-to-monitor RGB lookup table. Finally, the existing monitor-to-printer (MP) table is used to convert the inverted table into the final color table (i.e. a scanner-to-printer (SP) table). The second procedure is the major part of the present invention. The flowcharts of the whole process are shown in FIGS. 2 and 3.

I. Build Monitor RGB to Scanner RGB Lookup Table

The following steps are used to build a monitor RGB to scanner RGB lookup table:

(a) Uniform cubic monitor RGB grids are sampled from the monitor RGB space. Evenly spaced n points are selected for each of the R, G, or B. The points create an electronic representation 10 corresponding to a range of color combinations. All combinations of the selected RGB points will give a total of $n^3$ grid points in the 3-dimensional RGB space. In the preferred embodiment the value of n=9 providing 729 points corresponding to a range of colors. Each monitor RGB point is matched to printer point using a pre-built Monitor-to-Printer (MP) relationship 12. In the preferred embodiment the relationship is a color table for a given media. This table has been built using device independent color spaces and calculations which are well known in the art. The electronic representation 10 is then printed on a printer 14 creating a printed image 16. Between two color patches, a 2-pixel white area is reserved. In the preferred embodiment the 729 color patches fit on a single page.

(b) The printed image 16 is then scanned using a scanner 18 creating a scanner image 20. In the scanner image 20 (which contains 729 color squares in the preferred embodiment), the RGB values measured by the scanner 18 within each color square may vary from pixel to pixel (depending on the scanner property and the printer halftoning) though these pixels actually correspond to a single monitor RGB point. Since the edges of each color patch may be affected by the white gap or the neighboring patches, each patch's RGB values are measured in the ⅔ internal area and averaged to provide RGB points for each color patch to create the scanner image 20. In the preferred embodiment, the 729 monitor RGB points and 729 corresponding scanner RGB points will form a Monitor-to-Scanner (MS) relationship. In the preferred embodiment the relationship is a RGB lookup table.

II. Build Inverted Scanner RGB to Monitor RGB Lookup Table

One method to build a Scanner-to-Monitor (SM) relationship from a monitor-to-scanner (MS) RGB lookup table is regression. However, it is found that the regression method often results in out-of-limit values (less than zero or greater than 255 for 8-bit digital counts) and also the accuracy is poor. Thus, the new process was developed. The new process is based on the assumption that when large number of points are sampled in a source color space, values of a neighbor can be approximately considered to be "piece-wise linear from" one space to another. The procedures of this new method are described as follows.

Build Initial Scanner-to-Monitor Lookup Table (ISM-LUT)

(a) Entry points for a Scanner-to-Monitor (SM) RGB lookup table are created. Uniform cubic scanner RGB grids are created with m points evenly spaced in the whole range of each R, G, or B, giving a total of $m^3$ grid points. In the preferred embodiment the total grid points are normally chosen to be the same as those entry points of the Monitor-to-Printer (MP) lookup table, which are usually equal to $17^3$=4913 grid points.

(b) An initial monitor RGB point for each entry point on the Scanner-to-Monitor RGB lookup table is computed. Looking to FIG. 4 a given scanner grid point S is shown. A measured monitor RGB point (M in FIG. 4(a)) whose corresponding scanner RGB point (U in FIG. 4(b)) is closest to the scanner grid point under consideration is located. Around Point M in the monitor color space, a tri-linear interpolation scheme is employed to find the corresponding scanner RGB of a monitor point which is not measured. This interpolation continues until reaching the boundary of the neighboring measured monitor points. During this search, any monitor point whose corresponding scanner point is closer to the point S than a previously found point will be recorded. The "closest" monitor point (H in FIG. 4) found in this way will be assigned to the scanner point S. The distance between the closest point found (T in FIG. 4) and the grid point S is also recorded for use in the later process.

Continuing Steps (a) and (b) for all scanner grid points, an initial scanner-to-monitor lookup table, denoted as ISM-LUT is obtained. To reduce the redundant interpolations and speed up the process, one can first interpolate the measured monitor-to-scanner table to a denser-grid space and then perform Steps (a) and (b).

Compute Interpolation Error Matrix

In the scanner RGB space, a uniform grid space with $m^3$ points has been filled with $m^3$ initial corresponding monitor RGB points found in the ISM-LUT. Each of the scanner grid points may have an error for the corresponding monitor RGB values due to the interpolation and/or the "closest" nature in the search. This error should be estimated for improving the color reproduction accuracy. This is performed by the following procedures.

Figure 4:
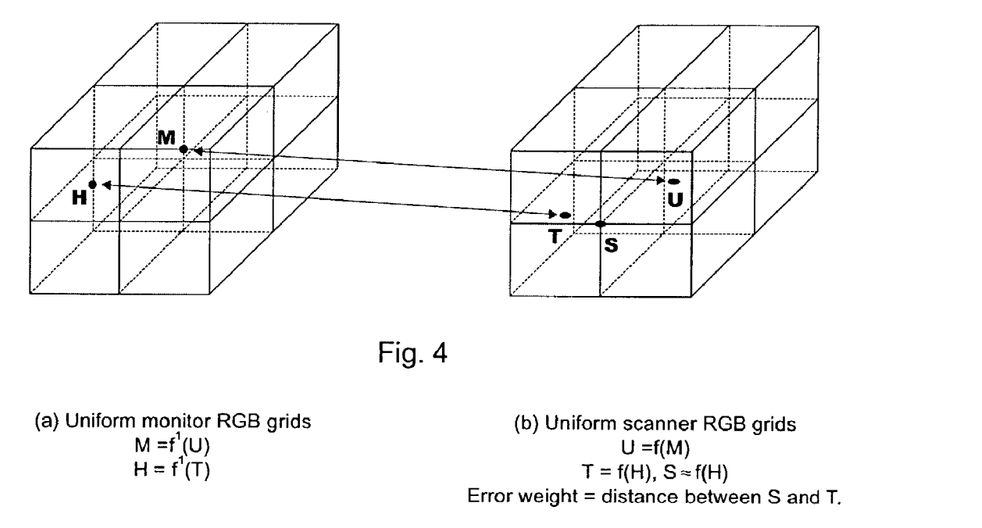
FIG. 4 illustrates the Monitor and Scanner grids.

(a) In the scanner RGB space, there are $n^3$ measured points which are usually not on the scanner RGB grid points of the ISM-LUT (e.g., point U in FIG. 4). Each of the measured scanner points (U) has a corresponding measured monitor point (M in FIG. 4), that is, M=f(U). Applying the "piece-wise linear" assumption, a tri-linear interpolation scheme can also be used for scanner RGB space (FIG. 4(b)). Thus another function value g(U) at point (U) can be found by interpolating the 8 corner grids' values (see FIG. 4(b)) in the ISM LUT found in Step 1. If the ISM-LUT were accurate and the "piece-wise linear" assumption is held, g(U) and f(U) should be the same. Therefore, the difference between the two values will account for the interpolation error due to the inaccurate ISM-LUT and assumption, that is, error=f(U)−g(U) for scanner point U.

Applying the interpolation scheme to the $n^3$ measured points in the scanner space using the ISM-LUT, we will have an error matrix consisting of $n^3$ errors.

Estimate Errors on Uniform Scanner RGB Grids

The error matrix computed above is normally not on the uniform scanner RGB grid of the ISM-LUT. In order to correct the uniform spaced color table, the error on the uniform grid should be estimated. In the following description, the process of error estimation for a one-dimensional (1D) situation is given first and then the method for three-dimensional (3D) situation is described.

Figure 5:
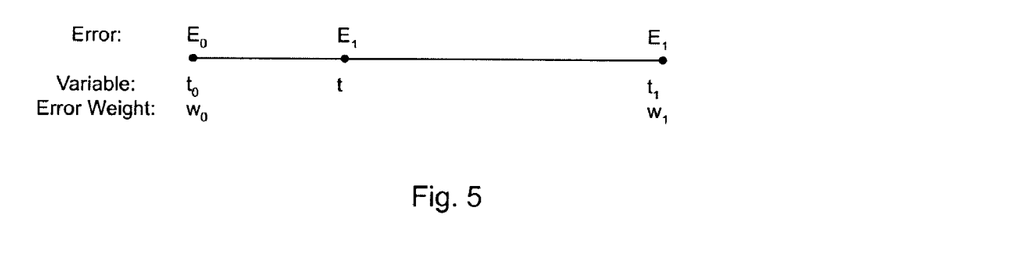
FIG. 5 illustrates the one dimensional error estimation.

FIG. 5 shows one line segment $t_0t_1$, which could be considered as a line segment taken from the uniform spaced 3D space where the $t_0t_1$ is parallel to one of the 3 primary axes, and $t_0$ and $t_1$ are the two grid points. Let $E_0$, $E_1$=errors at $t_0$ and $t_1$ respectively.

E=error at t.

Then applying linear interpolation gives $$E=(1-c_t)E_0+c_t E_1 \quad (1)$$

where $$c_t = \frac{t-t_0}{t_1-t_0} \quad (2)$$

In our situation, E is a known value, whereas $E_0$ and $E_1$ are unknown. Thus Eq. 1 alone could not solve the two unknown variables. We consider two situations: (a) If a value is found to be exactly on a grid point, the error on this grid should be zero. If the value is found on a point with a distance from the grid, then the error should not be zero. Assume that the error is proportional to the distance and denote it as error weight. (b) Assume that the grid error is proportionally related to the error E (at t) by its distance from point t. These two assumptions lead to the following equations:

$$E_0=(1-c_t)\lambda w_0 E \quad (3)$$

$$E_1=c_t \lambda w_1 E \quad (4)$$

where, $w_0$, $w_1$ are error weights at $t_0$ and $t_1$ respectively, and $\lambda$ is a common factor of the two grid points which will be solved below.

Substituting Eq. 3 and 4 into 1 gives $$\lambda = \frac{1}{(1-c_t)^2 w_0 + c_t^2 w_1} \quad (5)$$

Substituting Eq. 5 into 3 and 4 yields $$E_0 = \frac{(1-c_t)w_0}{(1-c_t)^2 w_0 + c_t^2 w_1} E \qquad (6)$$

$$E_1 = \frac{c_t w_1}{(1-c_t)^2 w_0 + c_t^2 w_1} E \qquad (7)$$

Using Eq. 6 and 7, the estimated errors on the two grid points are computed.

Three-Dimensional Error Estimation

FIG. 6(a) shows a small sub-3D cube in which there is a point with an interpolated error E. Based on the above idea, the error on each of the 8 corner points of the cube due to the error E can be estimated. The error weights of the 8 corner points are known. Any other point's error weight within the cube can be obtained by tri-linear interpolation. The line segment $E_{z0}E_{z1}$ shown in FIG. 6(b) is through E and parallel to z-axis. Analogous to Eq. 6 and 7

$$E_{z0} = \frac{(1-c_z)w_{z0}}{(1-c_z)^2 w_{z0} + c_z^2 w_{z1}} E \qquad (8)$$

$$E_{z1} = \frac{c_z w_{z1}}{(1-c_z)^2 w_{z0} + c_z^2 w_{z1}} E \qquad (9)$$

where $$c_z = \frac{z - z_0}{z_1 - z_0} \qquad (10)$$

and the constants $w_{z0}$ and $w_{z1}$ are error weights for $E_{z0}$ and $E_{z1}$ respectively.

FIG. 6(c) shows a bottom plane of the cube. The line segment $E_{z00}E_{z10}$ is through $E_{z0}$ (found in Eq. 8) and parallel to y-axis. Equivalent to Eq. 6 and 7:

$$E_{z00} = \frac{(1-c_y)w_{z00}}{(1-c_y)^2 w_{z00} + c_y^2 w_{z10}} E_{z0} \qquad (11)$$

$$E_{z10} = \frac{c_y w_{z10}}{(1-c_y)^2 w_{z00} + c_y^2 w_{z10}} E_{z0} \qquad (12)$$

where $$c_y = \frac{y - y_0}{y_1 - y_0} \qquad (13)$$

and the constants $w_{z00}$ and $w_{z10}$ are error weights for $E_{z00}$ and $E_{z10}$ respectively.

The bottom line segment $E_{000}E_{100}$ in FIG. 6(c) is through $E_{z00}$ (found in Eq. 11) and parallel to x-axis. Equivalent to Eq. 6 and 7:

$$E_{000} = \frac{(1-c_x)w_{000}}{(1-c_x)^2 w_{000} + c_x^2 w_{100}} E_{z00} \qquad (14)$$

$$E_{100} = \frac{c_x w_{100}}{(1-c_x)^2 w_{000} + c_x^2 w_{100}} E_{z00} \qquad (15)$$

where $$c_x = \frac{x - x_0}{x_1 - x_0} \qquad (16)$$

and the constants $w_{000}$ and $w_{100}$ are error weights for $E_{000}$ and $E_{100}$ respectively.

The top line segment $E_{010}E_{110}$ in FIG. 6(c) is through $E_{z10}$ (found in Eq. 12) and parallel to x-axis. Equivalent to Eq. 6 and 7:

$$E_{010} = \frac{(1-c_x)w_{010}}{(1-c_x)^2 w_{010} + c_x^2 w_{110}} E_{z10} \qquad (17)$$

$$E_{110} = \frac{c_x w_{110}}{(1-c_x)^2 w_{010} + c_x^2 w_{110}} E_{z10} \qquad (18)$$

where the constants $w_{010}$ and $w_{110}$ are error weights for $E_{010}$ and $E_{110}$ respectively.

FIG. 6(d) shows a top plane of the cube. The line segment $E_{z01}E_{z11}$ is through $E_{z1}$ (found in Eq. 9) and parallel to y-axis. Equivalent to Eq. 6 and 7:

$$E_{z01} = \frac{(1-c_y)w_{z01}}{(1-c_y)^2 w_{z01} + c_y^2 w_{z11}} E_{z1} \qquad (19)$$

$$E_{z11} = \frac{c_y w_{z11}}{(1-c_y)^2 w_{z01} + c_y^2 w_{z11}} E_{z1} \qquad (20)$$

where the constants $w_{z01}$ and $w_{z11}$ are error weights for $E_{z01}$ and $E_{z11}$ respectively.

The bottom line segment $E_{001}E_{101}$ in FIG. 6(d) is through $Ez01$ (found in Eq. 19) and parallel to x-axis. Equivalent to Eq. 6 and 7:

$$E_{001} = \frac{(1-c_x)w_{001}}{(1-c_x)^2 w_{001} + c_x^2 w_{101}} E_{z01} \qquad (21)$$

$$E_{101} = \frac{c_x w_{101}}{(1-c_x)^2 w_{001} + c_x^2 w_{101}} E_{z01} \qquad (22)$$

where the constants $w_{001}$ and $w_{101}$ are error weights for $E_{001}$ and $E_{101}$ respectively.

The top line segment $E_{011}E_{111}$ in FIG. 6(d) is through $E_{z11}$ (found in Eq. 20) and parallel to x-axis. Equivalent to Eq. 6 and 7:

$$E_{011} = \frac{(1-c_x)w_{011}}{(1-c_x)^2 w_{011} + c_x^2 w_{111}} E_{z11} \qquad (23)$$

$$E_{111} = \frac{c_x w_{111}}{(1-c_x)^2 w_{011} + c_x^2 w_{111}} E_{z11} \qquad (24)$$

where the constants $w_{011}$ and $w_{111}$ are error weights for $E_{011}$ and $E_{111}$ respectively.

Figure 6:
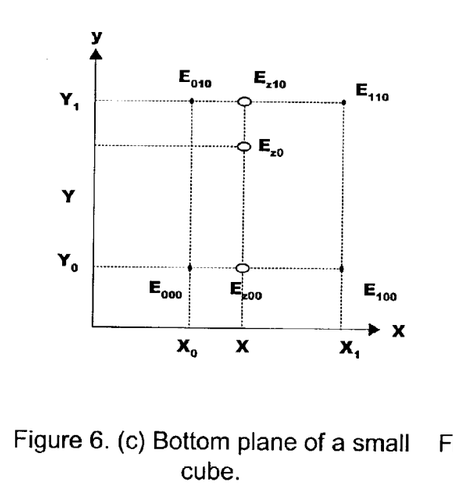
FIG. 6 illustrates the three dimensional error estimation.

As mentioned above, any error weights within the cube can be computed by linear interpolation. The following equations are for computing the error weights inside the cube involved in Eq. 8, 9, 11, 12, 19, and 20.

$$w_{z00} = (1-c_x)w_{000} + c_x w_{100} \quad (25)$$

$$w_{z10} = (1-c_x)w_{010} + c_x w_{110} \quad (26)$$

$$w_{z01} = (1-c_x)w_{001} + c_x w_{101} \quad (27)$$

$$w_{z11} = (1-c_x)w_{011} + c_x w_{111} \quad (28)$$

$$w_{z0} = (1-c_y)w_{z00} + c_y w_{z10} \quad (29)$$

$$w_{z1} = (1-c_y)w_{z01} + c_y w_{z11} \quad (30)$$

Substituting Eq. 25 and 26 into Eq. 29 gives $$w_{z0} = w_{000} + c_x(w_{100} - w_{000}) + c_y(w_{010} - w_{000}) + c_x c_y(w_{110} - w_{010} - w_{100} + w_{000}) \quad (31)$$

Similarly, substituting Eq. 27 and 28 into Eq. 30 yields $$w_{z1} = w_{001} + c_x(w_{101} - w_{001}) + c_y(w_{011} - w_{001}) + c_x c_y(w_{111} - w_{011} - w_{101} + w_{001}) \quad (32)$$

In summary, the errors on the 8 corner points of a small cube due to its inside error E are computed by the following steps:

(1). Compute cx, cy, and cz by Eq. 10, 13, and 16.
(2). Compute error weights that are not on the corners, $w_{z00}$, $w_{z10}$, $w_{z01}$, $w_{z11}$, $w_{z0}$, and $w_{z1}$, by Eq. 25–28, and 31–32.
(3). Compute the intermediate errors inside the cube, $E_{z0}$, $E_{z1}$, $E_{z00}$, $E_{z10}$, $E_{z01}$, $E_{z11}$, by Eq. 8–9, 11–12, and 19–20.
(4). Compute 4 corners' errors on the bottom plane of the cube, $E_{000}$, $E_{100}$, $E_{010}$, $E_{110}$, by Eq. 14–15 and 17–18.
(5). Compute 4 corners' errors on the top plane of the cube, $E_{001}$, $E_{101}$, $E_{011}$, $E_{111}$, by Eq. 21–24.
(6). If there are more than one error points inside the small cube, repeat Step (1) to (5) to compute next error on each of the corners. Repeat Step (1) to (6) for all small cubes in the scanner space.

After completing the above steps, there may be more than one errors for each grid point. The average of the errors will be assigned to the grid point.

Correct Initial Scanner-to-Monitor Lookup Table

Let the value of a grid point in the initial scanner-to-monitor lookup table be $V_0$, and the corrected value be $V_c$, and $E_a$ be the averaged error of the point computed by the above procedure, then:

$$V_c = V_0 + E_a$$

The corrected values for all grid points will form a scanner-to-monitor (SM) relationship for use in the next step.

The result is a Scanner-to-Monitor (SM) relationship 22 and in the preferred embodiment the relationship is a lookup table. This relationship 22 is stored for future use.

III. Build Scanner RGB to Printer CMYK Lookup Table

To build a scanner-to-printer (SP) relationship 24 and in the preferred embodiment a color table from the above two procedures I and II, the developed scanner-to-monitor (SM) RGB lookup table 22 is consulted. As mentioned in the first section, there is already a pre-built monitor-to-printer (MP) RGB lookup table 12. Thus, building a Scanner-to-Printer (SP) RGB lookup table 24 is simply a forward searching and interpolating process based on the SM and MP lookup tables 22 and 24. For a given scanner RGB point, a monitor RGB point is selected from the SM table 22. Then a printer CMYK point is selected from the MP table 24. If the monitor RGB point is not on the grid of the MP table 24, some interpolation scheme (e.g. tri-linear interpolation) can be used to find the printer CMYK point.

The SP relationship or table 24 can be stored on any computer readable medium including the PC driver, or in the AIO unit firmware or in the scanner firmware. When an image is scanned, the scanned RGB will be translated into CMYK using the SP table 24. The printer will then print the scanned image that looks like the original.

Use of the invented process can occur during several scenarios. In the preferred embodiment the new process is used at the manufacturing facility. A system is developed having an All-in-One machine. The printer is calibrated to the system using known methods in order to conform to the standardized colors found in a device independent color space. The method of the present invention is then used to develop a Scanner-to-Printer lookup table which is stored in the firmware for the AIO or the software of the CPU.

The invented process can also be used for initial calibration of a new system or recalibration an existing system having a printer, scanner, monitor and CPU. Assuming the printer can print images from the monitor in a device independent color space using a monitor to printer lookup table, the method can then be used to calibrate the scanner to the printer. A program executing the method described can be stored on any computer usable medium such as a floppy disk, CD, DVD or on a file downloaded from the internet. The program is then executed and the invented process is used to create a Scanner-to-Printer relationship or lookup table. This table is then incorporated into the scanner firmware or the software on the CPU. In the "copy" mode the printer is sent input derived from the created Scanner-to-Printer relationship and the image is printed.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, hexagonal interpolation could be used to develop the lookup tables, and the scope of the present invention should not be limited by any of the above-described exemplary embodiments, but should be defined only in accordance with the following claims appended hereto and their equivalents.

What is claimed is:

1. A method of calibrating a scanner in a system having a printer, a monitor, a CPU and a monitor-to-scanner lookup table, the calibration method comprising the steps of:
   (a) creating an electronic representation corresponding to a range of color combinations of Red, Green and Blue, said range being consistent with a monitor color combination range of said monitor;
   (b) printing a printer image on said printer using said monitor-to-printer lookup table;
   (c) scanning said printer image with said scanner to create a scanner image;
   (d) creating a monitor-to-scanner relationship by relating said electronic representation to said scanner image;
   (e) creating a scanner-to-monitor relationship using said monitor-to-scanner relationship;

(f) creating a scanner-to-printer relationship using said scanner-to-monitor relationship and said monitor-to-printer relationship, and (g) storing said scanner-to-printer relationship.

2. The method of claim 1 wherein said creating a scanner-to-monitor relationship further comprises:
   (1) selecting a plurality of points in a scanner color space;
   (2) associating said scanner color space points with a plurality of points in a monitor color space;
   (3) adjusting said plurality of monitor color space points using tri-linear interpolation;
   (4) adjusting said plurality of scanner color space points using tri-linear interpolation; and
   (5) adjusting said plurality of scanner color space points by error compensation.

3. The method of claim 1 wherein said creating a scanner-to-monitor relationship further comprises data translation on said monitor-to-scanner relationship by formula and error compensation.

4. The method of claim 1 wherein said scanner-to-printer relationship is a look-up table.

5. The method of claim 1 wherein said electronic representation contains $n^3$ colors.

6. A computer program, on a computer usable medium for calibrating a scanner to a printer, the program comprising:
   means for creating an electronic representation of a range of color combinations;
   means for printing a printer image of said electronic representation using a pre-existing monitor-to-printer relationship;
   means for scanning said printer image to create a scanner image;
   means for creating a monitor-to-scanner relationship using said electronic representation and said scanner image;
   means for computing a scanner-to-monitor relationship;
   means for creating a scanner-to-printer relationship for correlating a scanner point to a corresponding printer point; and
   means for storing said scanner-to-printer relationship.

7. The program of claim 6 wherein said scanner-to-printer relationship is a lookup table.

8. The program of claim 6 wherein said means for computing said scanner-to-monitor relationship includes data translation by formula and error compensation.

9. A method of calibrating a scanner in a system having a printer, monitor, and a monitor-to-printer relationship, the method comprising the steps of:
   (a) computing a scanner-to-monitor relationship for relating a scanner color space to a monitor color space, comprising:
      (1) selecting a plurality of points in a scanner color space;
      (2) associating said scanner color space points with a plurality of points in a monitor color space;
      (3) adjusting said plurality of monitor color space points using tri-linear interpolation;
      (4) adjusting said plurality of scanner color space points using tri-linear interpolation; and
      (5) adjusting said plurality of scanner color space points by error compensation;
   (b) creating a scanner-to-printer lookup table for relating a printer point to an identified scanner point; and
   (c) storing said scanner-to-printer lookup table for use by said system to create an accurate copy of a scanned image on said printer.

* * * * *